United States Patent
Gharesi et al.

(10) Patent No.: US 10,077,640 B2
(45) Date of Patent: Sep. 18, 2018

(54) TIE-BACK SEAL ASSEMBLY

(71) Applicant: Halliburton Energy Services, Inc., Houston, TX (US)

(72) Inventors: Abdol Reza Gharesi, Southlake, TX (US); Raymond Yit Long Chua, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 238 days.

(21) Appl. No.: 14/909,964

(22) PCT Filed: Sep. 10, 2014

(86) PCT No.: PCT/US2014/054992
§ 371 (c)(1),
(2) Date: Feb. 3, 2016

(87) PCT Pub. No.: WO2016/039738
PCT Pub. Date: Mar. 17, 2016

(65) Prior Publication Data
US 2016/0251933 A1  Sep. 1, 2016

(51) Int. Cl.
*E21B 43/10* (2006.01)
*F16J 15/38* (2006.01)
*E21B 33/129* (2006.01)

(52) U.S. Cl.
CPC .......... *E21B 43/10* (2013.01); *E21B 33/1293* (2013.01); *F16J 15/38* (2013.01)

(58) Field of Classification Search
CPC ........ E21B 33/1293; E21B 43/10; F16J 15/38
See application file for complete search history.

(56) References Cited

U.S. PATENT DOCUMENTS 4,611,829 A * 9/1986 Hughes ................. E21B 33/038
166/344
5,080,173 A * 1/1992 Brammer ............. E21B 33/043
166/208
(Continued)

FOREIGN PATENT DOCUMENTS

WO      2012/052402 A2    4/2012

OTHER PUBLICATIONS

International Search Report and Written Opinion, Application No. PCT/US2014/054992, 14 pages, dated May 27, 2015.

(Continued)

*Primary Examiner* — Brad Harcourt
(74) *Attorney, Agent, or Firm* — Baker Botts L.L.P.

(57) ABSTRACT

A tie-back seal system is disclosed. The system includes a tie-back seal assembly including an outer sleeve, an inner sleeve disposed within the outer sleeve, a shear pin extending through the outer and inner sleeves, and a ratch-latch pin coupled to and disposed downhole from the inner sleeve. The system also includes a tie-back liner disposed within the inner sleeve and coupled to the outer and inner sleeves using the shear pin such that the shear pin prevents axial movement of the tie-back liner relative to the outer and inner sleeves. The system further includes a tie-back receptacle configured to engage the ratch-latch pin to prevent axial movement of the inner sleeve and tie-back liner in an uphole direction and including a shoulder that, when in contact with the outer sleeve, prevents axial movement of the outer sleeve in a downhole direction.

31 Claims, 6 Drawing Sheets

(56) References Cited

U.S. PATENT DOCUMENTS

| | | |
|---|---|---|
| 2006/0108119 A1 | 5/2006 | Bailey et al. |
| 2006/0144622 A1 | 7/2006 | Bailey et al. |
| 2008/0251256 A1 | 10/2008 | Bennett et al. |
| 2010/0078178 A1 | 4/2010 | Watson |
| 2013/0299176 A1 | 11/2013 | Yokley et al. |
| 2014/0054047 A1 | 2/2014 | Zhou |
| 2014/0238692 A1 | 8/2014 | Watson |

OTHER PUBLICATIONS

European Search Report; Application No. 10152946.9, 3 pages, dated Feb. 6, 2012.

* cited by examiner

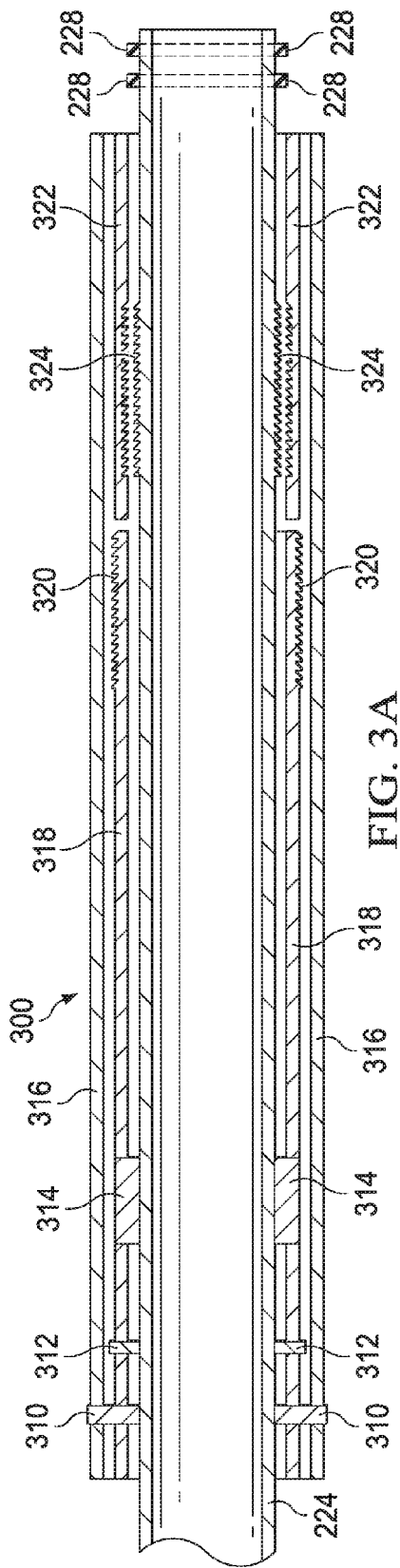
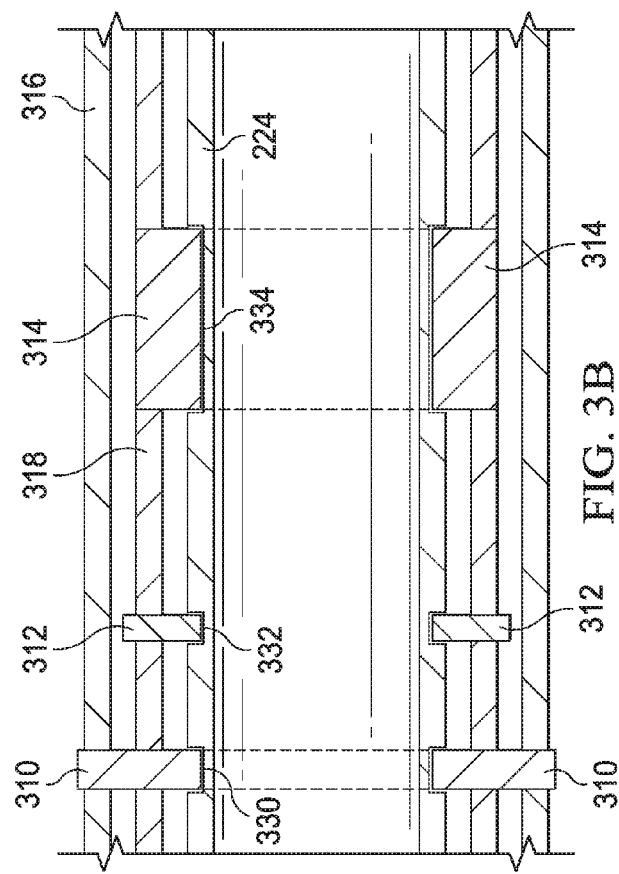
FIG. 3A
FIG. 3B

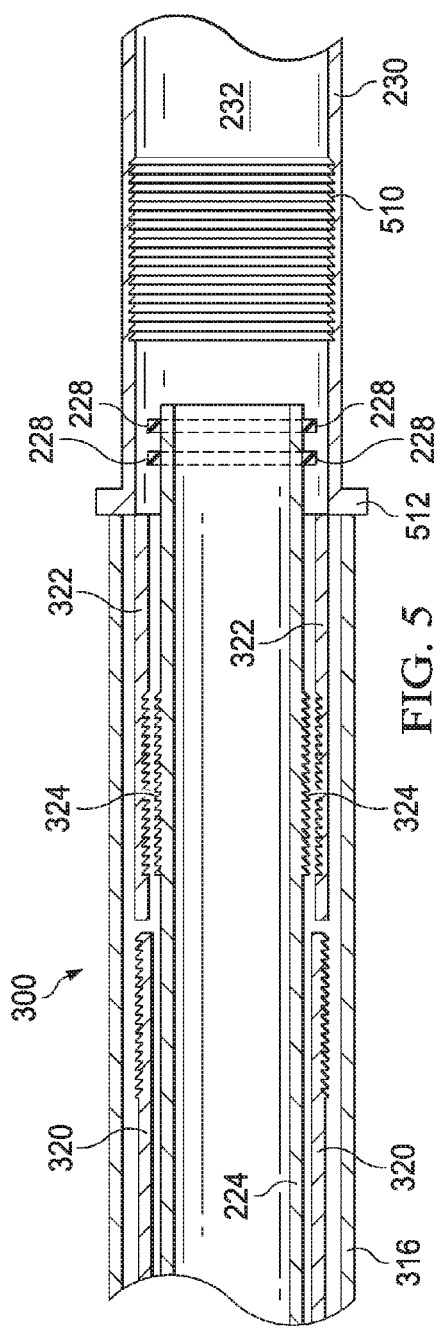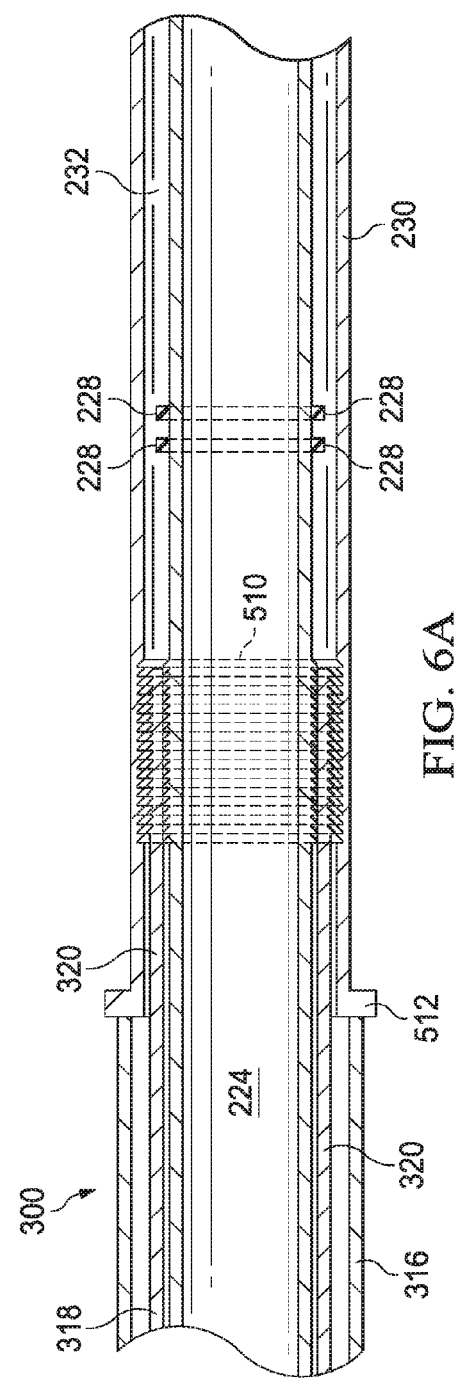

TIE-BACK SEAL ASSEMBLY

RELATED APPLICATION

This application is a U.S. National Stage Application of International Application No. PCT/US2014/054992 filed Sep. 10, 2014, which designates the United States, and which is incorporated herein by reference in its entirety.

TECHNICAL FIELD

The present disclosure relates generally to equipment used and operations performed in connection with well drilling operations and, more particularly, to a tie-back sealing system.

BACKGROUND

When performing subterranean operations, a wellbore is typically drilled and completed to facilitate removal of desired materials (e.g., hydrocarbons) from a subterranean formation. The entire length of the wellbore may not be drilled in one continuous run. Instead, the wellbore may be drilled in sections. Once a section of the wellbore is drilled, a casing may be inserted into the completed section of the wellbore. It may be desirable to continue drilling downhole from the cased section of the wellbore in order to drill additional sections of the wellbore. Sections of the wellbore downhole from the cased portion of the wellbore may be lined using a liner lowered through the cased portion of the wellbore. The liner may extend from the downhole end of casing to the distal end of the wellbore. Additionally, a tie-back liner may be inserted inside the cased upper sections of the wellbore to reinforce the wellbore and/or to connect the lower sections of the wellbore to the surface of the wellbore. The tie-back liner may extend from the surface of the wellbore to the liner located at the downhole end of the casing. A tie-back seal assembly may be used to seal the tie-back liner to the liner located at the downhole end of the casing.

BRIEF DESCRIPTION OF THE DRAWINGS

For a more complete understanding of the present invention and its features and advantages, reference is now made to the following description, taken in conjunction with the accompanying drawings, in which:

FIG. 3A is a cross-sectional view of an example embodiment of a tie-back seal assembly in accordance with some embodiments of the present disclosure;

FIG. 3B is a cross-sectional view of an example embodiment of a tie-back liner coupled to an inner sleeve and an outer sleeve in accordance with some embodiments of the present disclosure;

FIG. 5 is a cross-sectional view of an example embodiment of a tie-back seal assembly and a tie-back receptacle in accordance with some embodiments of the present disclosure;

FIG. 6A is a cross-sectional view of an example embodiment of a tie-back seal assembly coupled to a tie-back receptacle in accordance with some embodiments of the present disclosure;

DETAILED DESCRIPTION

Embodiments of the present disclosure and its advantages are best understood by referring to FIGS. 1 through 7, where like numbers are used to indicate like and corresponding parts.

Figure 1:
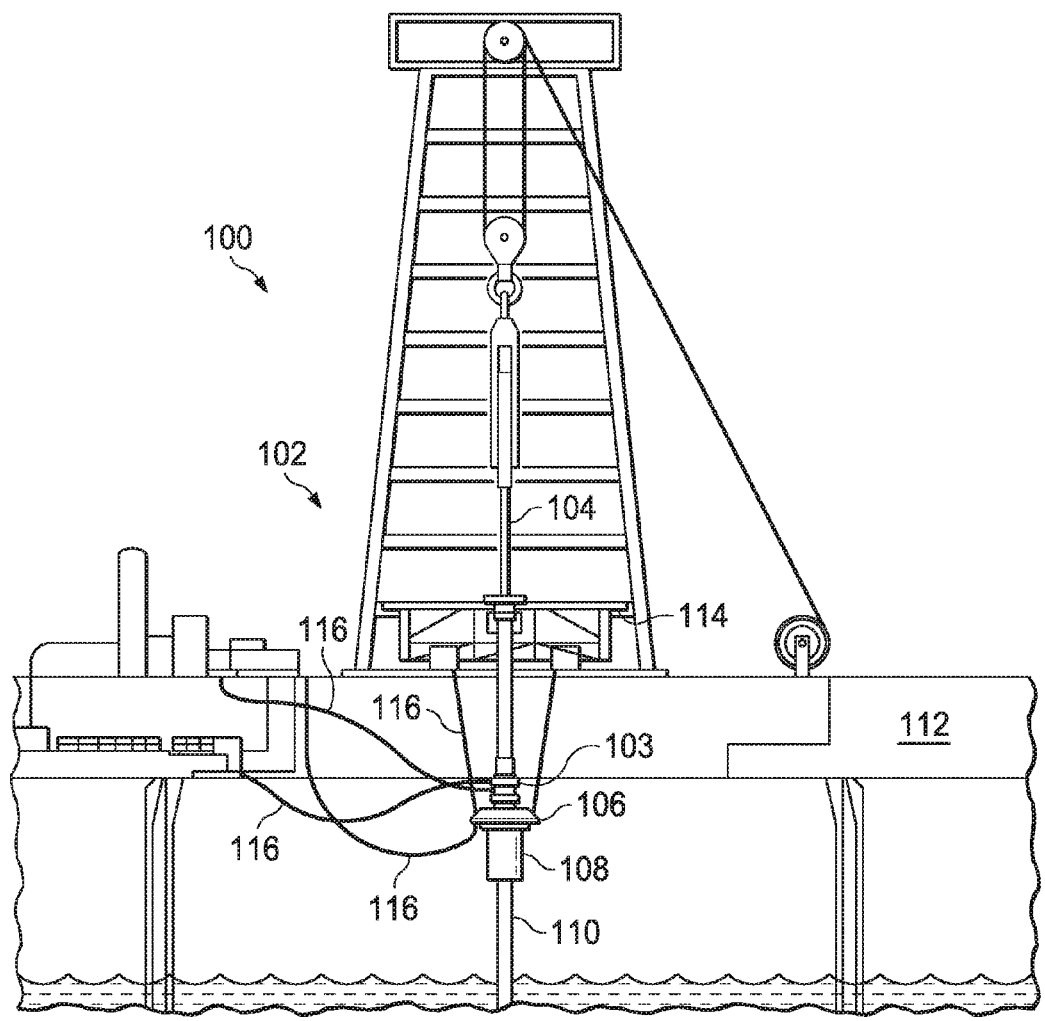
FIG. 1 illustrates an example embodiment of a drilling system configured to perform drilling operations in accordance with some embodiments of the present disclosure.

FIG. 1 illustrates an example embodiment of a drilling system configured to perform drilling operations, in accordance with some embodiments of the present disclosure. Drilling system 100 may include drilling unit 102, drill string 104, rotating control device (RCD) 106, sliding joint 108, and riser assembly 110. Drilling unit 102 may be any type of drilling system configured to perform drilling operations. Although FIG. 1 illustrates the use of RCD 106 from a floating drilling unit, those skilled in the art will understand that RCD 106 can be deployed from any type of onshore or offshore drilling unit including, but not limited to, Semi Submersible, Drill Ship, Jack Up, Production Platform, Tension Leg Platform and Land Drilling units.

Drilling unit 102 may include rig floor 112, which is supported by several support structures (not expressly shown). Rotary table 114 may be located above rig floor 112 and may be coupled to drill string 104 in order to facilitate the drilling of a wellbore using a drill bit (not expressly shown) coupled to the downhole end of drill string 104. Drill string 104 may include several sections of drill pipe that communicate drilling fluid from drilling unit 102 and provide torque to the drill bit. In the illustrated embodiment, the drilling fluid may be circulated back to drilling unit 102 through riser assembly 110. In other embodiments, such as a land drilling unit, the drilling fluid may be circulated through the wellbore or a casing included in the wellbore. Additionally, various cables 116 may couple RCD 106, slip joint 108, and riser assembly 110 to equipment on drilling unit 102.

In the illustrated embodiment, drill string 104 may extend from drilling unit 102 through riser assembly 110 and into a subsea wellbore (not expressly shown) formed in the ocean floor. An upper portion of RCD 106 may be coupled to drilling unit 102 by an above-RCD riser, tie-back riser or telescoping joint, where the upper end of the riser or joint may be coupled to a drilling unit diverter housing (not expressly shown). A seal element or packer (not expressly shown) may be located within the body of RCD 106 and may be removed or inserted with the aid of latch assembly 103 integral, either internally or externally, to RCD 106.

A lower portion of RCD 106 may be coupled to sliding joint 108. In one embodiment, sliding joint 108 may be a telescoping joint that includes an inner barrel and an outer barrel that move relative to each other in order to allow offshore platform 102 to move during drilling operations without breaking drill string 104 and/or riser assembly 110.

Sliding joint 108 may be coupled to riser assembly 110, which provides a temporary extension of a subsea wellbore (not expressly shown) to offshore drilling unit 102.

Figure 2:
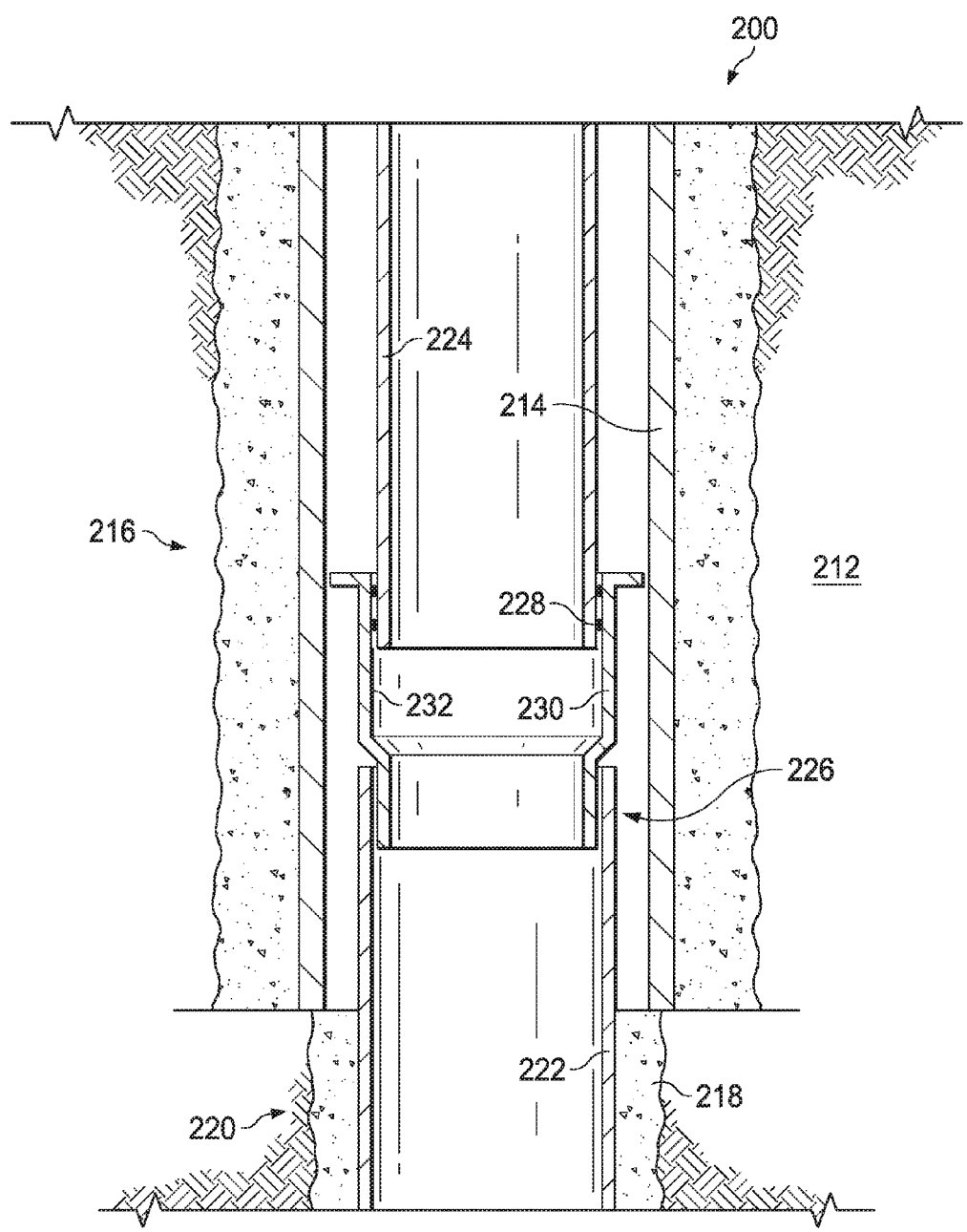
FIG. 2 is a cross-sectional view of an example wellbore in accordance with some embodiments of the present disclosure.

FIG. 2 is a cross-sectional view of an example wellbore in accordance with some embodiments of the present disclosure. The term "wellbore" may be used to describe any hole drilled into a formation for the purpose of exploration or extraction of natural resources such as, for example, hydrocarbons. As shown in FIG. 2, wellbore 200 may be drilled through earth formation 212. Casing 214 may be placed in an upper section 216 of wellbore 200 and held in place by cement 218, which may be injected between casing 214 and upper section 216 of wellbore 200. The terms "uphole" and "downhole" may be used to describe the location of various components relative to the bottom or end of wellbore 200 shown in FIG. 2. For example, a first component described as uphole from a second component may be further away from the end of wellbore 200 than the second component. Similarly, a first component described as being downhole from a second component may be located closer to the end of wellbore 200 than the second component.

A lower section 220 of wellbore 200 may be drilled below casing 214. Lower section 220 may have a smaller diameter than upper section 216. A liner 222 may be used to line lower section 220 of wellbore 200. Liner 222 may be lowered through casing 214. In some embodiments, cement may be injected between liner 222 and the walls of lower section 220 of wellbore 200. Unlike casing 214, liner 222 may not extend to the surface of wellbore 200. Instead, liner 222 may extend from a point downhole of the surface of wellbore 200 to the distal end of wellbore 200. In some embodiments, liner 222 may be one continuous pipe or tube. In other embodiments, the liner 222 may include a series of pipes or tubes coupled to one another. The term "couple," "couples," or "coupling" may be used to describe either an indirect or a direct connection. For example, if a first device couples to a second device, that connection may be through a direct connection or through an indirect connection via other devices and connections.

Liner 222 may be supported by liner hanger 226, which may be coupled to casing 214 at a point downhole from the surface of wellbore 200. In some embodiments, liner hanger 226 may be coupled to liner 222 at the uphole end of liner 222. In other embodiments, liner hanger 226 may be formed as part of liner 222.

Tie-back receptacle 230 may be coupled to the uphole end of liner hanger 226. In some embodiments, tie-back receptacle 230 may be coupled to the uphole end of liner hanger 226 by a threaded joint. In other embodiments, a different coupling mechanism may be employed. Polished inner surface 232 of tie-back receptacle 230 may be smooth and may be machined to a close tolerance to permit work strings, production tubing, liners, etc., to be coupled to liner 222 in a fluid-tight and pressure-tight manner.

As an example, liner 222 may be coupled to tie-back liner 224, which may be used to extract fluids at high pressure without exposing casing 214 to the pressure of the fluid being extracted. Tie-back liner 224 may be similar to liner 222, except that tie-back liner 224 may extend from the surface of wellbore 200 to a point downhole of the surface of wellbore 200, while liner 222 may extend from a point downhole of the surface of wellbore 200 to the distal end of wellbore 200. For example, tie-back liner 224 may extend from the uphole end of liner 222 to the surface of the wellbore 200, while liner 222 may extend from the downhole end of tie-back liner 224 to the distal end of wellbore 200.

In some embodiments, tie-back liner 224 may be one continuous pipe or tube. In other embodiments, tie-back liner 224 may include a series of pipes or tubes coupled to one another. Tie back liner 224 may also include seals 228 that engage with polished inner surface 232 of tie-back receptacle 230 to form a fluid-tight and pressure-tight seal with tie-back liner 224. Although two seals 228 are depicted for illustrative purposes, any number of seals 228 may be used. In some embodiments, seals 228 may be a molded seal made of an elastomeric material. The elastomeric material may be compounds including, but not limited to, natural rubber, nitrile rubber, hydrogenated nitrile, urethane, polyurethane, fluorocarbon, perfluorocarbon, propylene, neoprene, hydrin, etc.

Offshore applications may traditionally use, a floating or sliding seal between tie-back liner 224 and tie-back receptacle 230, in which tie-back liner 224 is permitted to move axially (e.g., the liner is permitted to move along its axis) in both the uphole and downhole directions relative to the tie-back receptacle 230. The movement associated with a floating or sliding seal may, however, cause increased wear on the seal and/or may decrease the reliability of the seal.

In contrast, the tie-back seal assembly of the present disclosure provides a seal between tie-back liner 224 and tie-back receptacle 230 in which tie-back liner 224 is not permitted to move axially in the uphole direction relative to tie-back receptacle 230. As a result, a more reliable, longer lasting seal between tie-back liner 224 and tie-back receptacle 230 may be provided.

FIG. 3A is a cross-sectional view of an example embodiment of a tie-back seal assembly 300 coupled to tie-back liner 224 in accordance with some embodiments of the present disclosure. The tie-back seal assembly 300 may include shear pins 310, torque pins 312, dogs 314, outer sleeve 316, inner sleeve 318, ratch-latch pin 320, and body lock ring 322. FIG. 3B is a cross-sectional view of an example embodiment of tie-back liner 224 coupled to inner sleeve 318 and outer sleeve 316 in accordance with some embodiments of the present disclosure.

In some embodiments, tie-back seal assembly 300 may be coupled to tie-back liner 224 via at least one of shear pins 310, dogs 314, torque pins 312, and body lock ring 322. For example, as shown in FIG. 3B, tie-back liner 224 may include groove 330 to accommodate shear pins 310. In some embodiments, shear pins 310 may be made of a metal or metal alloy such as steel or brass. Shear pins 310 may extend through outer sleeve 316 and inner sleeve 318 into groove 330 on tie-back liner 224. When seated in groove 330, shear pins 310 may allow tie-back liner 224 to rotate about its axis within outer sleeve 316 and inner sleeve 318 of tie-back seal assembly 300, but may prevent tie-back liner 224 from moving axially within outer sleeve 316 and the inner sleeve 318.

Tie-back liner 224 may also include groove 334 (shown in FIG. 3B) to accommodate dogs 314. When seated in groove 334, dogs 314 may allow tie-back liner 224 to rotate about its axis within inner sleeve 318, but may prevent tie-back liner 224 from moving axially within inner sleeve 318. In some embodiments, dogs 314 may be made of a metal or metal alloy such as steel. Additionally, tie-back liner 224 may include slots 332 (shown in FIG. 3B) to accommodate torque pins 312. When seated in slots 332, torque pins 312 may transfer the rotation of tie-back liner 224 to inner sleeve 318, such that rotation of tie-back liner 224 induces rotation of inner sleeve 318. Rotation of inner sleeve 318 may induce rotation of ratch-latch pin 320, which may be coupled to or formed as part of inner sleeve 318. In some embodiments, torque pins 312 may be made of a metal or metal alloy such as steel.

As shown in FIG. 3A, Tie-back liner 224 may further include a slip thread 324 formed in the outer surface of tie-back liner 224. Slip thread 324 may engage with body lock ring 322. The thread profiles of slip thread 324 and body lock ring 322 may be configured to allow one-way, ratcheting movement of tie-back liner 224 through the threaded profile of body lock ring 322. This one-way, ratcheting movement of tie-back liner 224 prevents tie-back liner 224 from moving axially in the uphole direction, but allows axial movement of tie-back liner 224 in the downhole direction. Allowing axial movement of tie-back liner 224 in the downhole direction may accommodate thermal expansion or other forces applied to tie-back liner 224 in the downhole direction. Thermal expansion may occur, for example, due to temperature changes in the well during production. As discussed in detail below with respect to FIG. 6, a force may be applied to tie-back liner 224 in the downhole direction in order to couple tie-back seal assembly 300 with tie-back receptacle 230. The interface and interaction between slip thread 324 of tie-back liner 224 and body lock ring 322 of tie-back seal assembly 300 is discussed in detail below with respect to FIGS. 4A and 4B.

Figure 4A:
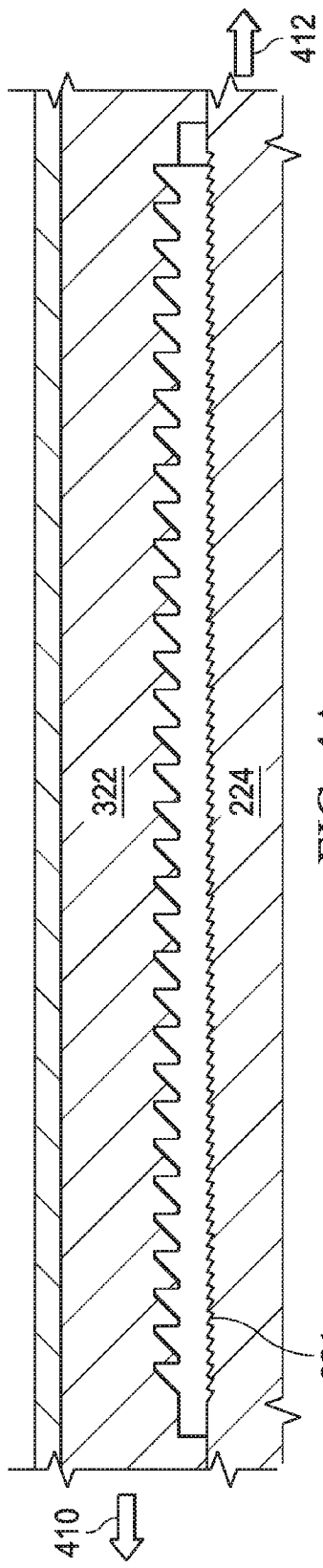
FIG. 4A illustrates an example embodiment of a slip thread interface between a tie-back seal assembly and a liner in accordance with some embodiments of the present disclosure.
Figure 4B:
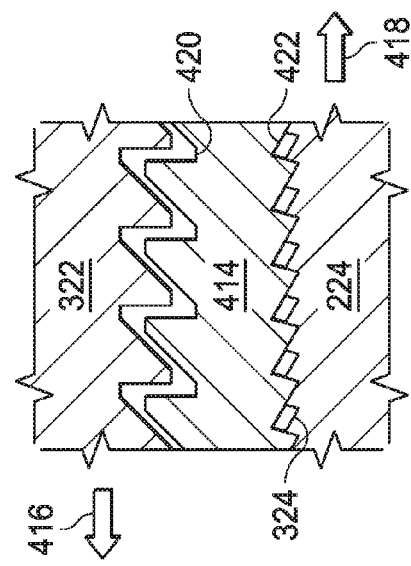
FIG. 4B illustrates another example embodiment of a slip thread interface of a tie-back seal assembly and a liner in accordance with some embodiments of the present disclosure.

FIGS. 4A and 4B illustrate cross sectional views of example embodiments of a slip thread interface between tie-back seal assembly 300 and liner 224 in accordance with some embodiments of the present disclosure. As shown in FIG. 4A, the thread profiles of slip thread 324 and body lock ring 322 are configured to allow axial movement of tie-back liner 224 in the downhole direction (indicated by the arrow 412) and axial movement of body lock ring 322 in the uphole direction (indicated by the arrow 410). As shown in FIG. 4B, in some embodiments, ratch ring 414 may be utilized between body lock ring 322 and slip thread 324 to facilitate this movement. Ratch ring 414 may include thread profile 420 configured to interface with the thread profile on body lock ring 322 such that axial movement of the body lock ring 322 in the uphole direction (indicated by arrow 416) is allowed, but axial movement of body lock ring 322 in the downhole direction (indicated by arrow 418) is prevented. Ratch ring 414 may also include thread profile 422 configured to interface with the thread profile of slip thread 324 such that axial movement of tie-back liner 224 in the downhole direction (indicated by arrow 418) is allowed, but axial movement of tie-back liner 224 in the uphole direction (indicated by arrow 416) is prevented. The interface between body lock ring 322, ratch ring 414, and slip thread 324 thus allows axial movement of tie-back liner 224 in the downhole direction (indicated by arrow 418) to accommodate thermal expansion or other forces.

FIG. 5 is a partial cross-sectional view of an example embodiment of tie-back receptacle 230 and tie-back seal assembly 300 coupled to liner 224 in accordance with some embodiments of the present disclosure. Tie-back liner 224 and tie-back seal assembly 300 may be inserted into the wellbore to a point where tie-back seal assembly 300 contacts, but is not coupled to tie-back receptacle 230. For example, tie-back liner 224 and tie-back seal assembly may be inserted into wellbore 200 to a point where outer sleeve 316 of tie-back seal assembly 300 contacts shoulder 512 of tie-back receptacle 230 and the downhole end of tie-back liner 224 extends into tie-back receptacle 230 and seals 228 of tie-back liner 224 engage with polished face 232 of tie-back receptacle 230 to form a fluid and pressure-tight seal. In this position, axial movement of tie-back liner 224 and tie-back seal assembly 300 in the downhole direction is constrained by outer sleeve 316, which is in contact with shoulder 512 of tie-back receptacle 230, and the shear pins 310, which are configured to engage with grooves on liner 224 to prevent tie-back liner 224 from moving axially within outer sleeve 316.

Before tie-back seal assembly 300 is coupled to tie-back receptacle 230, pressure tests may be conducted to ensure sealing integrity between seals 228 and polished surface 232. Additionally, a determination may be made regarding the length of tie-back liner 224. If the length of tie-back liner 224 is approximately equivalent to the distance between the surface of the wellbore and tie-back receptacle 230, tie-back liner 224 may remain coupled to tie-back receptacle 230 without modification or replacement. If, on the other hand, the length of tie-back liner 224 substantially exceeds the distance between the surface of the wellbore and tie-back receptacle 230, tie-back liner 224 may be cut to a length approximately equivalent to the distance between the surface of the wellbore and tie-back receptacle 230 or replaced with a different tie-back liner of a length approximately equivalent to the distance between the surface of the wellbore and tie-back receptacle 230.

The distance between the surface of the wellbore and tie-back receptacle 230 may be determined by calculating or measuring the length of the portion of tie-back liner 224 inserted into wellbore 200 to the point where outer sleeve 316 contacts shoulder 512. In some embodiments, this length may be determined by direct measurement of the length of the portion of liner 224 inserted into wellbore 200. In other embodiments, this length may be determined by calculation. For example, if liner 224 is a known length, the length of the portion of liner 224 remaining above the surface of the wellbore may be measured and subtracted from the known length of liner 224 to determine the length of the portion of liner 224 inserted into the wellbore. Although this method of calculation is provided as an example, there may be many additional methods to calculate the length of the portion of liner 224 inserted into the wellbore.

If the length of tie-back liner 224 substantially exceeds the distance between the surface of the wellbore and tie-back receptacle 230, tie-back liner 224 and tie-back seal assembly 300 may, in some embodiments, be extracted from the wellbore before cutting tie-back liner 224 to a length approximately equivalent to the distance between the surface of the wellbore and tie-back receptacle 230. In other embodiments, tie-back liner 224 may be cut to a length approximately equivalent to the distance between the surface of the wellbore and tie-back receptacle 230 without extracting tie-back liner 224 and tie-back seal assembly 300 from the wellbore. In still other embodiments, tie-back liner 224 may be replaced with a tie-back liner of a length approximately equivalent to the distance between the surface of the wellbore and tie-back receptacle 230. For example, tie-back liner 224 and tie-back seal assembly 300 may be extracted from the wellbore and a different tie-back liner of a length approximately equivalent to the distance between the surface of the wellbore and tie-back receptacle 230 may be coupled to tie-back seal assembly 300.

If tie-back liner 224 and tie-back seal assembly 300 were extracted from the wellbore to cut tie-back liner 224 to length (or to replace tie-back liner 224 with a different tie-back liner), tie-back liner 224 and tie-back seal assembly 300 may be inserted into the wellbore a second time to the point where outer sleeve 316 of tie-back seal assembly 300 contacts shoulder 512 of tie-back receptacle 230 and the downhole end of tie-back liner 224 extends into tie-back receptacle 230, as shown in FIG. 5.

FIG. 6A is a partial cross-sectional view of an example embodiment of a tie-back seal assembly 300 coupled to tie-back receptacle 230 in accordance with some embodiments of the present disclosure. After tie-back liner 224 and tie-back seal assembly 300 have been inserted into the wellbore to the point where outer sleeve 316 of tie-back seal assembly 300 contacts shoulder 512 of tie-back receptacle 230 (either the first or the second time), tie-back seal assembly 300 may be coupled to tie-back receptacle 230. A force may be applied to tie-back liner 224 in the downhole direction, which may cause shear pins 310 to shear, thereby permitting tie-back liner 224 and inner sleeve 318 to move axially in the downhole direction within outer sleeve 316.

Axial movement of tie-back liner 224 and inner sleeve 318 within outer sleeve 316 may permit tie-back liner 224 to move axially into tie-back receptacle 230 until ratch-latch pin 320 of tie-back seal assembly 300 engages with box thread 510 of tie-back receptacle 230. Ratch-latch pin 320 may be coupled to or formed as part of inner sleeve 318. When ratch-latch pin 320 is engaged with box thread 510, seals 228 of tie-back liner 224 may engage with polished inner surface 232 of tie-back receptacle 230 to form a fluid and pressure-tight seal.

Figure 6B:
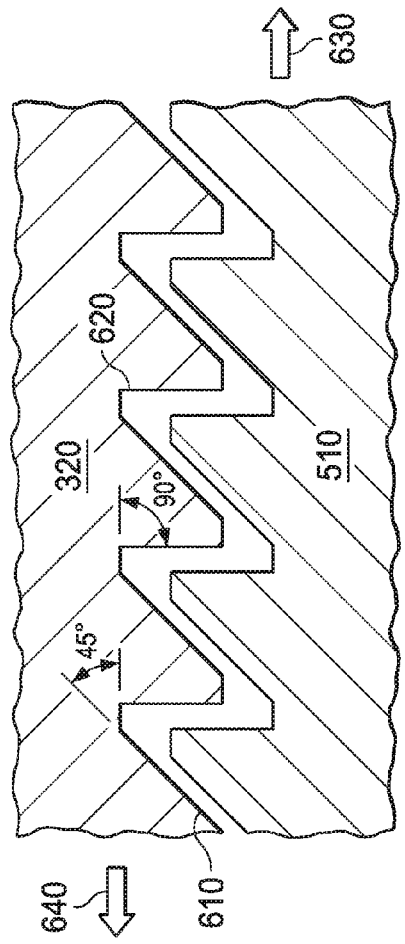
FIG. 6B is a cross-sectional view of an example embodiment of a thread profile of a ratch-latch pin in accordance with some embodiments of the present disclosure.

Engagement of ratch-latch pin 320 with box thread 510 may prevent axial movement of tie-back liner 224 in the uphole direction, but may allow axial movement of tie-back liner 224 in the downhole direction. For example, as shown in FIG. 6B, the thread profile of ratch-latch pin 320 may include angled face 610 that allows ratch-latch pin 320 (and thus tie-back liner 224) to move axially in the downhole direction (indicated by arrow 630) into box thread 510 and shoulder 620 that prevents axial movement of ratch-latch pin 320 (and thus tie-back liner 224) in the uphole direction (indicated by arrow 640). In some embodiments, angled face 610 may be a 45 degree face that allows ratch-latch pin 320 (and thus tie-back liner 224) to move axially in the downhole direction (indicated by arrow 630) into box thread 510 and shoulder 620 may be a 90 degree shoulder that prevents axial movement of ratch-latch pin 320 (and thus tie-back liner 224) in the uphole direction (indicated by arrow 640). This one-way, ratcheting movement of ratch-latch pin 320 allows axial movement of tie-back liner 224 in the downhole direction to accommodate thermal expansion or other forces, while preventing axial movement of the tie-back liner 224 in the uphole direction (which may reduce the reliability of the seal between liner 224 and tie-back receptacle 230).

Permitting one-way axial movement of tie-back liner 224 in the downhole direction may also eliminate the need to precisely calculate the length of tie-back liner 224. Tie-back liner 224 may be fixedly coupled to the surface of the wellbore such that axial movement of the tie-back liner 224 in the uphole and downhole direction is prevented. If tie-back liner 224 were coupled to tie-back receptacle 230 in a similar manner, the length of tie-back liner 224 would have to be precisely determined in order to facilitate fixedly coupling tie-back liner 224 to both tie-back receptacle 230 and the surface of the wellbore. Because tie-back liner 224 and tie-back receptacle 230 are coupled in a manner that permits axial movement of the tie-back liner in the downhole direction, however, the length of tie-back liner 224 need not be precise. As an example, if the length of tie-back liner 224 exceeds the distance between the surface of the wellbore and tie-back receptacle 230, a force may be applied to tie-back liner 224 in the downhole direction such that tie-back liner 224 extends into tie-back receptacle 230 until a point at which the uphole end of tie-back liner 224 may be coupled to the surface of wellbore 200.

Ratch-latch pin 320 may be configured such that engagement with box thread 510 may be released by rotating ratch-latch pin 320 in a particular direction. For example, ratch-latch pin 320 may be configured with a left-hand thread such that the connection between ratch-latch pin 320 and box thread 510 may be released by applying a right hand torque to tie-back liner 224. The applied torque may be transferred from tie-back liner 224 to ratch-latch pin 320 via torque pins 312. As discussed above with respect to FIGS. 3A and 3B, torque pins 312 may engage tie-back liner 224 such that torque pins 312 transfer the rotation of tie-back liner 224 to inner sleeve 318 and thus ratch-latch pin 320, which may be coupled to or formed as part of inner sleeve 318.

Engagement of ratch-latch pin 320 with box thread 510 may be tested by applying a force to tie-back liner 224 in the uphole direction. If ratch-latch pin 320 is engaged with box thread 510, the applied force will not axially displace tie-back liner 224 in the uphole direction. Preventing tie-back liner 224 from moving axially in the uphole direction may provide a more reliable seal between tie-back liner 224 and tie-back receptacle 230 than the more traditional floating or sliding seal, in which tie-back liner 224 is permitted to move axially in both the uphole and downhole directions relative to tie-back receptacle 230.

Figure 7:
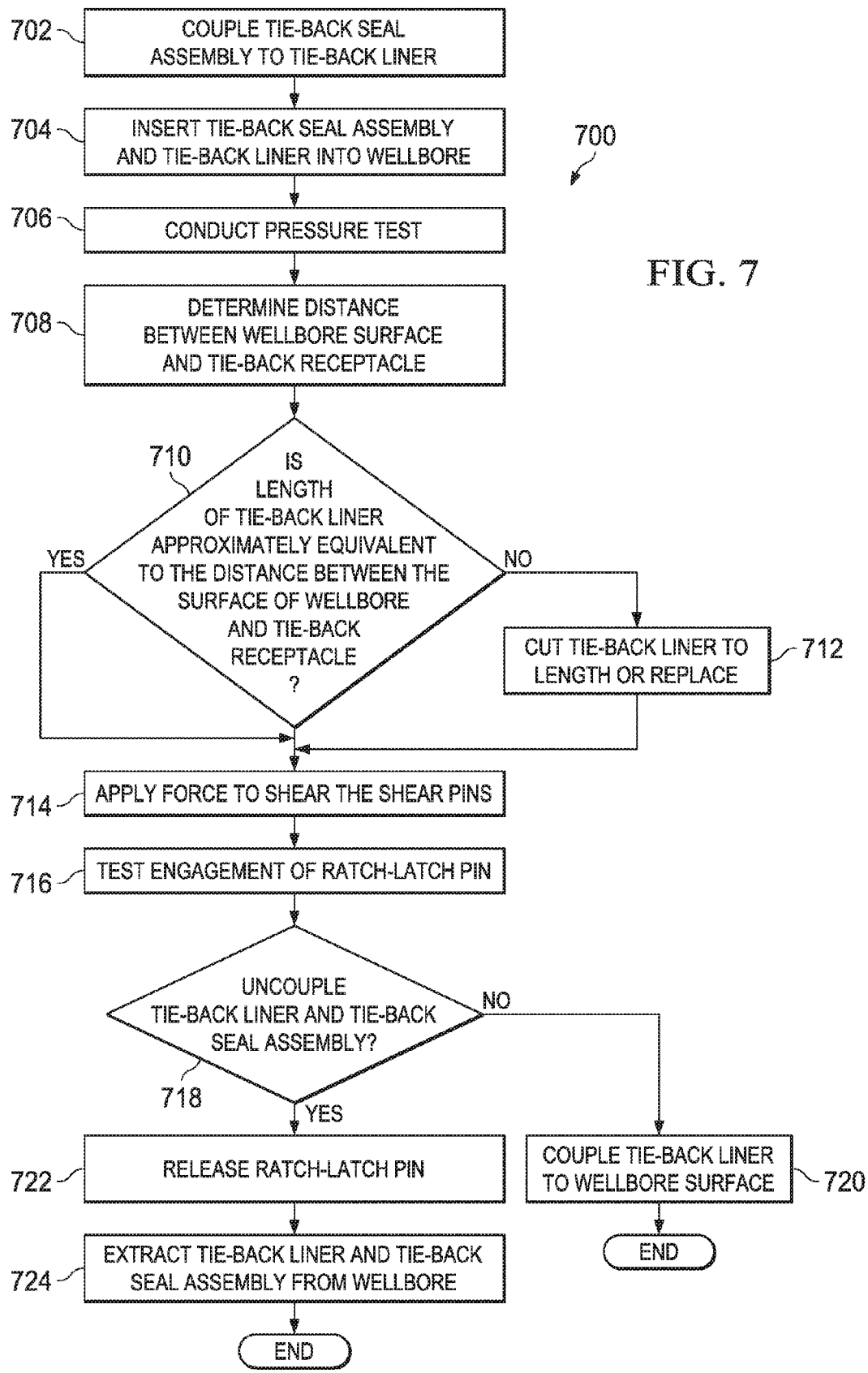
FIG. 7 is a flow chart of an example method for coupling a tie-back liner with a tie-back receptacle in accordance with some embodiments of the present disclosure.

FIG. 7 is a flow chart of an example method 700 for coupling a tie-back liner with a tie-back receptacle in accordance with some embodiments of the present disclosure. The method is described as being performed using tie-back seal assembly 300, liner 224, and tie-back receptacle 230, as described with respect to FIGS. 3-6, however, any other suitable system, apparatus, or device may be used.

The method 700 may begin, and at step 702, tie-back seal assembly 300 may be coupled with tie-back liner 224. As discussed above with respect to FIGS. 3A and 3B, the tie-back seal assembly 300 may be coupled to tie-back liner 224 via at least one of shear pins 310, dogs 314, torque pins 312, and body lock ring 322 of tie-back seal assembly 300. Shear pins 310 may extend through outer sleeve 316 and inner sleeve 318 into groove 330 on tie-back liner 224. When seated in groove 330, shear pins 310 may prevent tie-back liner 224 and inner sleeve 318 from moving axially within the outer sleeve 316, but may allow tie-back liner 224 and inner sleeve 318 to rotate within outer sleeve 316. Dogs 314 may extend through inner sleeve 318 into groove 334 on tie-back liner 224. When seated in groove 334, dogs 314 may prevent tie-back liner 224 from moving axially within inner sleeve 318, but may allow tie-back liner 224 to rotate within inner sleeve 318. Torque pins 312 may extend through inner sleeve 318 into slots 332 on tie-back liner 224. When seated in slots 332, torque pins 312 may transfer the rotation of tie-back liner 224 to inner sleeve 318, such that rotation of tie-back liner 224 induces rotation of inner sleeve 318 and ratch-latch pin 320, which may be coupled to or formed as part of inner sleeve 318.

Body lock ring 322 may engage with slip thread 324 on the outer surface of tie-back liner 224 such that a one-way, ratcheting movement of tie-back liner 224 through the threaded profile of body lock ring 322 is allowed. As discussed above with respect to FIGS. 3A and 4, this one-way, ratcheting movement of tie-back liner 224 through the threaded profile of body lock ring 322 prevents tie-back liner 224 from moving axially in the uphole direction, but allows axial movement of tie-back liner 224 in the downhole direction to accommodate thermal expansion or other forces.

At step 704, tie-back seal assembly 300 and tie-back liner 224 may be inserted into the wellbore to a point where outer sleeve 316 of tie-back seal assembly 300 contacts shoulder 512 of tie-back receptacle 230 and the downhole end of tie-back liner 224 extends into tie-back receptacle 230. As discussed above with respect to FIG. 5, in this position axial movement of tie-back liner 224 and tie-back seal assembly 300 in the downhole direction is constrained by outer sleeve 316, which is in contact with shoulder 512 of tie-back receptacle, and shear pins 310, which prevent tie-back liner 224 from moving axially within outer sleeve 316.

At step 706, a pressure test of the seal between tie-back liner 224 and tie-back receptacle 230 may be conducted. As discussed above with respect to FIG. 5, when tie-back seal assembly 300 and tie-back liner 224 are inserted into the wellbore to a point where outer sleeve 316 of tie-back seal assembly 300 contacts shoulder 512 of tie-back receptacle 230 and the downhole end of tie-back liner 224 extends into tie-back receptacle 230, seals 228 may engage with polished face 232 to form a fluid and pressure-tight seal between tie-back liner 224 and tie-back receptacle 230. Pressure tests may be conducted to ensure sealing integrity between seals 228 and polished surface 232.

At step 708, the distance between the surface of the wellbore and tie-back receptacle 230 may be determined by calculating or measuring the length of the portion of tie-back liner 224 inserted into the wellbore to the point where outer sleeve 316 contacts shoulder 512. As discussed above with respect to FIG. 5, this length may be determined by direct measurement or calculation. For example, the length of the portion of liner 224 inserted into the wellbore may be directly measured as liner 224 is inserted into or extracted from the wellbore. As another example, if liner 224 is a known length, the length of the portion of liner 224 remaining above the surface of the wellbore may be measured and subtracted from the known length of liner 224 to determine the length of the portion of liner 224 inserted into the wellbore. Although these methods of calculation and measurement are provided as an example, there may be many additional methods to calculate or measure the length of the portion of liner 224 inserted into the wellbore.

At step 710, a determination may be made regarding the length of tie-back liner 224. If the length of tie-back liner 224 is approximately equivalent to the distance between the surface of the wellbore and tie-back receptacle 230, the method may proceed to step 714. If, on the other hand, the length of tie-back liner 224 substantially exceeds the distance between the surface of the wellbore and tie-back receptacle 230, the method may proceed to step 712.

At step 712, tie-back liner 224 may be cut to a length approximately equivalent to the distance between the surface of the wellbore and tie-back receptacle 230 or replaced with a different tie-back liner of a length approximately equivalent to the distance between the surface of the wellbore and tie-back receptacle 230. As discussed above with respect to FIG. 5, tie-back liner 224 and tie-back seal assembly 300 may, in some embodiments, be extracted from the wellbore before cutting tie-back liner 224 to length, while in other embodiments, tie-back liner 224 may be cut to length without extracting tie-back liner 224 and tie-back seal assembly 300 from the wellbore. In still other embodiments, tie-back liner 224 and tie-back seal assembly 300 may be extracted from the wellbore and a different tie-back liner of a length approximately equivalent to the distance between the surface of the wellbore and tie-back receptacle 230 may be coupled to tie-back seal assembly 300.

If tie-back liner 224 and tie-back seal assembly 300 were extracted from the wellbore to cut tie-back liner 224 to length (or to replace tie-back liner 224 with a different tie-back liner), tie-back liner 224 and tie-back seal assembly 300 may be inserted into the wellbore a second time to the point where outer sleeve 316 of tie-back seal assembly 300 contacts shoulder 512 of tie-back receptacle 230 and the downhole end of tie-back liner 224 extends into tie-back receptacle 230, as shown in FIG. 5.

At step 714, a force may be applied to tie-back liner 224 in the downhole direction, which may cause shear pins 310 to shear, thereby permitting tie-back liner 224 and inner sleeve 318 to move axially in the downhole direction within outer sleeve 316. As discussed above with respect to FIGS. 6A and 6B, axial movement of tie-back liner 224 and inner sleeve 318 within outer sleeve 316 may permit tie-back liner 224 to move axially into tie-back receptacle 230 until ratch-latch pin 320 of tie-back seal assembly 300 engages with box thread 510 of tie-back receptacle 230. When ratch-latch pin 320 is engaged with box thread 510, seals 228 of tie-back liner 224 may engage with polished inner surface 232 of tie-back receptacle 230 to form a fluid and pressure-tight seal. As discussed above with respect to FIGS. 6A and 6B, engagement of ratch-latch pin 320 with box thread 510 may permit axial movement of tie-back liner 224 in the downhole direction to accommodate thermal expansion or other forces, while preventing axial movement of the tie-back liner 224 in the uphole direction (which may reduce the reliability of the seal between liner 224 and tie-back receptacle 230). Additionally, as discussed above with respect to FIGS. 6A and 6B, permitting one-way axial movement of tie-back liner 224 in the downhole direction may also eliminate the need to precisely calculate the length of tie-back liner 224.

Engagement of ratch-latch pin 320 with box thread 510 may be tested at step 716 by applying a force to tie-back liner 224 in the uphole direction. If ratch-latch pin 320 is engaged with box thread 510, the applied force will not axially displace tie-back liner 224 in the uphole direction. As discussed above with respect to FIGS. 6A and 6B, preventing tie-back liner 224 from moving axially in the uphole direction may provide a more reliable seal between tie-back liner 224 and tie-back receptacle 230 than a floating or sliding seal, in which tie-back liner 224 is permitted to move axially in both the uphole and downhole directions relative to tie-back receptacle 230.

At step 718, a determination may be made regarding whether to uncouple tie-back liner 224 from engagement with tie-back receptacle 230. If it is determined that tie-back liner 224 and tie-back receptacle 230 should remain coupled, the method may proceed to step 720. If it is determined that tie-back liner 224 and tie-back receptacle should be uncoupled, the method may proceed to step 722.

At step 720, tie-back liner 224 may be coupled to the surface of the wellbore. Tie-back liner 224 may be coupled to the surface of the wellbore such that axial movement of tie-back liner 224 in the uphole and downhole directions is prevented.

At step 722, tie-back liner 224 and tie-back receptacle 230 may be uncoupled by releasing ratch-latch pin 320 from engagement with box thread 510. As discussed above with respect to FIGS. 6A and 6B, ratch-latch pin 320 may, for example, be configured such that engagement with box thread 510 is released by rotating ratch-latch pin 320 in a particular direction. For example, ratch-latch pin 320 may be configured with a left-hand thread such that the connection between ratch-latch pin 320 and box thread 510 may be released by applying a right hand torque to tie-back liner 224. As discussed above with respect to FIGS. 3A and 3B, torque pins 312 may engage tie-back liner 224 such that torque pins 312 transfer the rotation of tie-back liner 224 to inner sleeve 318 and thus ratch-latch pin 320, which may be coupled to or formed as part of inner sleeve 318.

At step 724, tie-back liner 224 and tie-back seal assembly 300 may be extracted from the wellbore. Following extraction of tie-back liner 224 and tie-back seal assembly 300 from the wellbore, the method 700 may end. Modifications, additions, or omissions may be made to method 700 without departing from the scope of the present disclosure. For example, the order of the steps may be performed in a different manner than that described and some steps may be performed at the same time. Additionally, each individual step may include additional steps without departing from the scope of the present disclosure.

Although the present disclosure and its advantages have been described in detail, it should be understood that various changes, substitutions and alterations can be made herein without departing from the spirit and scope of the disclosure as defined by the following claims.

What is claimed is:

1. A tie-back seal assembly comprising:
   an outer sleeve;
   an inner sleeve disposed within the outer sleeve;
   a shear pin extending through the outer sleeve and the inner sleeve and configured to engage with a groove on a tie-back liner to prevent axial movement of the tie-back liner relative to the outer sleeve and the inner sleeve; and
   a ratch-latch pin coupled to and disposed downhole from the inner sleeve and configured to engage with a tie-back receptacle to prevent axial movement of the inner sleeve and the tie-back liner in an uphole direction.

2. The tie-back seal assembly of claim 1, further comprising a torque pin coupled to the inner sleeve and configured to engage with the tie-back liner to transfer rotation of the tie-back liner to the ratch-latch pin and the inner sleeve.

3. The tie-back seal assembly of claim 1, further comprising a lock ring configured to engage with a slip thread of the tie-back liner to allow axial movement of the tie-back liner within the outer sleeve in a downhole direction, but prevent axial movement of the tie-back liner within the outer sleeve in the uphole direction.

4. The tie-back seal assembly of claim 1, further comprising a dog coupled to the inner sleeve and configured to engage with the tie-back liner to allow the tie-back liner to rotate about its axis within the inner sleeve, but prevent axial movement of the tie-back liner within the inner sleeve.

5. The tie-back seal assembly of claim 1, wherein the outer sleeve comprises a downhole edge configured to contact a shoulder of the tie-back receptacle and prevent axial movement of the outer sleeve in a downhole direction.

6. The tie-back seal assembly of claim 1, wherein the ratch-latch pin comprises a thread profile configured to engage with a box thread of the tie-back receptacle to prevent axial movement of the tie-back liner in the uphole direction, but allow axial movement of the tie-back liner in a downhole direction.

7. The tie-back seal assembly of claim 6, wherein the thread profile of the ratch-latch pin comprises:
   an angled face that allows axial movement of the ratch-latch pin in the downhole direction; and
   a shoulder that prevents axial movement of the ratch-latch pin in the uphole direction.

8. The tie-back seal assembly of claim 6, wherein the thread profile of the ratch-latch pin comprises a left-hand thread configured such that right-hand rotation releases engagement with the box thread of the tie-back receptacle.

9. A tie-back seal system comprising:
   a tie-back seal assembly including:
   an outer sleeve;
   an inner sleeve disposed within the outer sleeve;
   a shear pin extending through the outer sleeve and the inner sleeve; and
   a ratch-latch pin coupled to and disposed downhole from the inner sleeve;
   a tie-back liner disposed within the inner sleeve and coupled to the outer sleeve and the inner sleeve using the shear pin such that the shear pin prevents axial movement of the tie-back liner relative to the outer sleeve and the inner sleeve; and
   a tie-back receptacle configured to engage with the ratch-latch pin to prevent axial movement of the inner sleeve and the tie-back liner in an uphole direction, the tie-back receptacle including:
   a shoulder that, when in contact with the outer sleeve of the tie-back seal assembly, prevents axial movement of the outer sleeve in a downhole direction.

10. The tie-back seal system of claim 9, wherein the tie-back seal assembly further comprises a torque pin coupled to the inner sleeve and engaged with the tie-back liner such that rotation of the tie-back liner induces rotation of the ratch-latch pin and the inner sleeve.

11. The tie-back seal system of claim 9, wherein the tie-back seal assembly further comprises a lock ring engaged with a slip thread of the tie-back liner that allows axial movement of the tie-back liner within the outer sleeve in the downhole direction, but prevents axial movement of the tie-back liner within the outer sleeve in the uphole direction.

12. The tie-back seal system of claim 9, wherein the tie-back seal assembly further comprises a dog coupled to the inner sleeve and engaged with the tie-back liner that allows the tie-back liner to rotate about its axis within the inner sleeve, but prevents axial movement of the tie-back liner within the inner sleeve.

13. The tie-back seal system of claim 9, wherein the outer sleeve comprises a downhole edge that, when in contact with the shoulder of the tie-back receptacle, prevents axial movement of the outer sleeve in the downhole direction.

14. The tie-back seal system of claim 9, wherein the ratch-latch pin comprises a thread profile that, when engaged with the box thread of the tie-back receptacle prevents axial movement of the tie-back liner in the uphole direction, but allows axial movement of the tie-back liner in the downhole direction.

15. The tie-back seal system of claim 14, wherein the thread profile of the ratch-latch pin comprises:
   an angled face that allows axial movement of the ratch-latch pin in the downhole direction; and
   a shoulder that prevents axial movement of the ratch-latch pin in the uphole direction.

16. The tie-back seal system of claim 14, wherein the thread profile of the ratch-latch pin comprises a left-hand thread that, when rotated to the right, releases engagement with the box thread of the tie-back receptacle.

17. The tie-back seal system of claim 9, wherein the tie-back liner comprises a seal disposed on the outer surface of the tie-back liner that forms a fluid and pressure tight seal between the tie-back liner and the tie-back receptacle when engaged with a polished inner surface of the tie-back receptacle.

18. The tie-back seal system of claim 9, wherein the tie-back receptacle further comprises a box thread configured to engage with the ratch-latch pin and prevent axial movement of the inner sleeve and the tie-back liner in an uphole direction.

19. A method of coupling a tie-back liner with a tie-back receptacle, comprising:
 coupling the tie-back liner to a tie-back seal assembly with a shear pin that, when engaged with the tie-back liner, prevents axial movement of the tie-back liner within an outer sleeve of the tie-back seal assembly;
 inserting the tie-back liner and the tie-back seal assembly into a wellbore to a point where the outer sleeve contacts a tie-back receptacle and a seal of the tie-back liner engages with the tie-back receptacle to form a fluid-tight and pressure-tight seal; and
 applying a force to the tie-back liner in a downhole direction sufficient to shear the shear pin and axially displace the tie-back liner in the downhole direction such that a ratch-latch pin of the tie-back seal assembly engages with the tie-back receptacle to prevent axial movement of the tie-back liner in an uphole direction relative to the tie-back receptacle.

20. The method of claim 19, further comprising:
 determining a distance between a surface of a wellbore and the tie-back receptacle; and
 cutting the tie-back liner to a length equivalent to the determined distance.

21. The method of claim 20, wherein cutting the tie-back liner to the length equivalent to the determined distance comprises:
 extracting the tie-back liner and the tie-back seal assembly from the wellbore; and
 inserting the tie-back liner and the tie-back seal assembly into the wellbore a second time to the point where the outer sleeve of the tie-back seal assembly contacts the tie-back receptacle.

22. The method of claim 19, wherein coupling the tie-back liner to the tie-back seal assembly comprises coupling the tie-back liner to the tie-back seal assembly with a torque pin that engages an inner sleeve of the tie-back seal assembly and the tie-back liner such that rotation of the tie-back liner induces rotation of the ratch-latch pin and the inner sleeve.

23. The method of claim 19, wherein coupling the tie-back liner to the tie-back seal assembly comprises coupling the tie-back liner to the tie-back seal assembly with a lock ring that, when engaged with a slip thread of the tie-back liner, allows axial movement of the tie-back liner within the outer sleeve in the downhole direction, but prevents axial movement of the tie-back liner within the outer sleeve in the uphole direction.

24. The method of claim 19, wherein coupling the tie-back liner to the tie-back seal assembly comprises coupling the tie-back liner to the tie-back seal assembly with a dog that, when engaged with an inner sleeve of the tie-back seal assembly and the tie-back liner, allows the tie-back liner to rotate about its axis within the inner sleeve, but prevents axial movement of the tie-back liner within the inner sleeve.

25. The method of claim 19, further comprising testing the seal between the tie-back liner and the tie-back receptacle after inserting the tie-back liner and the tie-back seal assembly into the wellbore to the point where the outer sleeve of the tie-back seal assembly contacts the shoulder of the tie-back receptacle.

26. The method of claim 19, further comprising releasing the engagement of the ratch-latch pin with the box thread by rotating the tie-back liner, wherein rotation of the tie-back liner induces rotation of the ratch-latch pin.

27. The method of claim 19, wherein the ratch-latch pin comprises:
 an angled face configured to permit axial movement of the ratch-latch pin in the downhole direction; and
 a shoulder configured to prevent axial movement of the ratch-latch pin in the uphole direction.

28. The method of claim 19, wherein inserting the tie-back liner and the tie-back seal assembly into a wellbore to a point where the outer sleeve contacts the tie-back receptacle comprises inserting the tie-back liner and the tie-back seal assembly into the wellbore to a point where the outer sleeve contacts a shoulder of the tie-back receptacle, the shoulder configured to prevent axial movement of the outer sleeve in the downhole direction.

29. The method of claim 19, wherein the ratch-latch pin of the tie-back seal assembly engages with a box thread of the tie-back receptacle to prevent axial movement of the tie-back liner in an uphole direction relative to the tie-back receptacle.

30. The method of claim 19, further comprising coupling the tie-back liner with a surface of a wellbore such that axial movement of the tie-back liner is prevented.

31. The method of claim 30, wherein coupling the tie-back liner to the surface of the wellbore comprises:
 determining a length of a portion of the tie-back liner extending beyond the surface of the wellbore;
 applying a force to tie-back liner in the downhole direction such that tie-back liner moves a distance equivalent to determined length; and
 coupling the tie-back liner with the surface of the wellbore.

* * * * *